United States Patent [19]
Tran

[11] Patent Number: 6,012,125
[45] Date of Patent: Jan. 4, 2000

[54] SUPERSCALAR MICROPROCESSOR INCLUDING A DECODED INSTRUCTION CACHE CONFIGURED TO RECEIVE PARTIALLY DECODED INSTRUCTIONS

[75] Inventor: Thang M. Tran, Austin, Tex.

[73] Assignee: Advanced Micro Devices, Inc., Sunnyvale, Calif.

[21] Appl. No.: 08/879,588

[22] Filed: Jun. 20, 1997

[51] Int. Cl.[7] .................................................. G06F 12/00
[52] U.S. Cl. ........................... 711/125; 711/126; 711/118
[58] Field of Search ..................................... 711/125, 126, 711/117, 100, 1, 118; 395/389, 390, 582

[56] References Cited

U.S. PATENT DOCUMENTS

| | | |
|---|---|---|
| 4,044,338 | 8/1977 | Wolf . |
| 4,437,149 | 3/1984 | Pomerane et al. ....................... 395/389 |
| 4,453,212 | 6/1984 | Gaither et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,353,419 | 10/1994 | Touch et al. ............................. 395/582 |
| 5,442,760 | 8/1995 | Rustad et al. . |
| 5,669,011 | 9/1997 | Alpert et al. ........................ 395/800.23 |
| 5,822,559 | 10/1998 | Narayau et al. .......................... 395/390 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

*Primary Examiner*—John W. Cabeca
*Assistant Examiner*—David Langjahr
*Attorney, Agent, or Firm*—Conley, Rose & Tayon, PC; Lawrence J. Merkel

[57] ABSTRACT

A decoded instruction cache which stores both directly executable and microcode instructions for concurrent dispatch to a plurality of issue positions. An instruction address required by a superscalar microprocessor is first presented to the decoded instruction cache. If the address is not present in the decoded instruction cache, the instruction bytes are retrieved either from an instruction cache or main memory. In either case, a group of instruction bytes are conveyed to an early decode unit, which performs partial decoding on the instructions therein. These partially decoded instructions are conveyed to the decoded instruction cache for storage. If the first instruction conveyed from the group of instruction bytes is a directly executable instruction, the partially decoded information corresponding to the first instruction is stored in a cache line selected according to the opcode of the first instruction. Directly executable instructions subsequent to the first instruction in the group of instruction bytes may be stored in succeeding locations in the same cache line. If the first instruction is a microcode instruction, operand information provided by the early decode unit is stored to one or more cache lines including directly executable instructions which, when executed, effectuate the operation of that microcode instruction. When a read is performed on a valid line in the decoded instruction cache, partially decoded instructions already aligned for dispatch are conveyed to a plurality of issue positions.

17 Claims, 8 Drawing Sheets

SUPERSCALAR MICROPROCESSOR INCLUDING A DECODED INSTRUCTION CACHE CONFIGURED TO RECEIVE PARTIALLY DECODED INSTRUCTIONS

BACKGROUND OF THE INVENTION

1. Field of the Invention

The present invention relates to the field of microprocessors and, more particularly, to caching of instructions within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

An important feature of a superscalar microprocessor (and a superpipelined microprocessor as well) is its branch prediction mechanism. The branch prediction mechanism indicates a predicted direction (taken or not-taken) for a branch instruction, allowing subsequent instruction fetch to continue with the predicted instruction stream indicated by the branch prediction. The predicted instruction stream includes instructions immediately subsequent to the branch instruction in memory if the branch instruction is predicted not-taken, or the instructions at the target address of the branch instruction if the branch instruction is predicted taken. Instructions from the predicted instruction stream may be speculatively executed prior to execution of the branch instruction, and in any case are placed into the instruction processing pipeline prior to execution of the branch instruction. If the predicted instruction stream is correct, then the number of instructions executed per clock cycle is advantageously increased. However, if the predicted instruction stream is incorrect (i.e., one or more branch instructions are predicted incorrectly), then the instructions from the incorrectly predicted instruction stream are discarded from the instruction processing pipeline and the number of instructions executed per clock cycle is decreased.

When branch misprediction occurs, the desired instruction stream is typically fetched from the instruction cache and conveyed through the pipeline of the microprocessor. The number of clock cycles that it takes the newly fetched instructions to propagate to the pipeline stage where the misprediction was originally detected is known as the branch misprediction penalty. The branch misprediction penalty increases when the desired instruction stream is not located in the instruction cache.

Typically, instruction fetching occurs early in the pipeline and branch misprediction is detected toward the end of the pipeline (upon instruction execution). Thus, the branch misprediction penalty tends to increase with the number of pipeline stages. The relative impact of branch misprediction on performance generally increases as well.

In microprocessors executing fixed-length instruction sets, instructions begin at regular intervals within an instruction cache line. This greatly simplifies the logic necessary to route instructions from a fetched cache line to decode and functional units. Instructions fetched as a result of branch misprediction then have fewer pipeline stages to traverse in order to reach the execute stage of the pipeline (and thus recover from the effects of the incorrectly predicted branch).

Microprocessors executing a variable-length instruction set (e.g., the x86 instruction set), however, may exhibit high branch misprediction penalties due to the increased complexity of the pipeline between the instruction fetch and execute stages. Unlike fixed-length instructions, variable-length instructions appear at irregular intervals within an instruction cache line. Accordingly, additional logic is employed for determination of instruction length and alignment of instructions for dispatch to one or more decode units. This translates to more pipeline stages between instruction fetch and execute, and thus to a higher branch misprediction penalty.

SUMMARY OF THE INVENTION

The problems outlined above are in large part solved by a decoded instruction cache in accordance with the present invention. In one embodiment, a decoded instruction cache is provided which stores both directly executable and microcode instructions for concurrent dispatch to a plurality of issue positions. An instruction address required by a superscalar microprocessor is first presented to the decoded instruction cache. If the address is not present in the decoded instruction cache, the instruction bytes are retrieved either from an instruction cache or main memory. In either case, a group of instruction bytes are conveyed to an early decode unit, which performs partial decoding on the instructions therein. These partially decoded instructions are conveyed to the decoded instruction cache for storage. If the first instruction conveyed from the group of instruction bytes is a directly executable instruction, the partially decoded information corresponding to the first instruction is stored in a cache line selected according to the opcode of the first instruction. Directly executable instructions subsequent to the first instruction in the group of instruction bytes may be stored in succeeding locations in the same cache line. If the first instruction is a microcode instruction, operand information provided by the early decode unit is stored to one or more cache lines including directly executable instructions which, when executed, effectuate the operation of that microcode instruction. When a read is performed on a valid line in the decoded instruction cache, partially decoded instructions already aligned for dispatch are conveyed to a plurality of issue positions.

Cache lines in the decoded instruction cache additionally include a PC value corresponding to the first instruction in the line, a pointer specifying the next cache entry, and branch prediction information for generating the next expected instruction address. When a particular cache line is selected, its next entry pointer and branch prediction information is employed to generate a next cache access. The pointer is used for the next access if valid, and branch prediction information is used to generate an expected address if the pointer is invalid. The decoded instruction cache may be searched for the expected address by performing a lookup operation.

The pipeline of a microprocessor employing a decoded instruction cache is effectively shortened. Instructions included in the decoded instruction cache are already scanned and aligned, and thus are ready for dispatch to one of a plurality of issue positions. The penalty due to mispredicted branches may be reduced if the target address of the branch is located in the decoded instruction cache. An efficient implementation of microcode functionality is also achieved by incorporating directly executable and microcode instructions in the same cache.

Broadly speaking, the present invention contemplates a decoded instruction cache comprising a first cache line including a first partially decoded, directly executable instruction and a second partially decoded, directly executable instruction. The decoded instruction cache is configured to convey the first partially decoded, directly executable instruction to a first issue position coupled to the decoded instruction cache and to concurrently convey the second partially decoded, directly executable instruction to a second issue position coupled to the decoded instruction cache in response to a read operation specifying the first cache line. The decoded instruction cache further comprises a second cache line including a first predetermined directly executable instruction, a second predetermined directly executable instruction, and corresponding operand information. The decoded instruction cache is configured to convey the first predetermined directly executable instruction and corresponding operand information to the first issue position and to concurrently convey the second predetermined directly executable instruction and corresponding operand information to the second issue position in response to a read operation specifying the second cache line. The first predetermined directly executable instruction and the second predetermined directly executable instruction comprise a microcode routine which, when executed, effectuates operation of a corresponding microcode instruction.

The present invention further contemplates a superscalar microprocessor comprising an instruction cache configured to convey a group of contiguous instruction bytes in response to receiving a fetch address, wherein a first instruction is located at the fetch address. The superscalar microprocessor further comprises an early decode unit configured to receive and partially decode the group of contiguous instruction bytes, thereby conveying a first partially decoded instruction corresponding to the first instruction. The superscalar microprocessor additionally comprises a decoded instruction cache configured to receive the first partially decoded instruction. The decoded instruction cache is configured to store the first partially decoded instruction if the first partially decoded instruction is directly executable by the superscalar microprocessor. Furthermore, the decoded instruction cache is configured to store operand information from the first partially decoded instruction and a plurality of predetermined directly executable instructions if the first partially decoded instruction is one of a plurality of microcode instructions. The plurality of predetermined directly executable instructions, employing the operand information, effectuate operation of the first instruction when executed by the superscalar microprocessor.

The present invention additionally contemplates a method for conveying partially decoded instructions from a decoded instruction cache comprising generating an initial entry pointer by decoding an instruction. The method next comprises receiving the initial entry pointer into the decoded instruction cache, thereby selecting a particular cache line which includes a plurality of partially decoded instructions and a next entry pointer. The plurality of partially decoded instructions effectuate an operation corresponding to the instruction if said instruction is a microcode instruction, while a first one of the plurality of partially decoded instructions represents the instruction if the instruction is a directly executable instruction. Additionally, the method comprises conveying the next entry pointer for a subsequent access to the decoded instruction cache. Finally, the method comprises dispatching at least one of the plurality of partially decoded instructions.

BRIEF DESCRIPTION OF THE DRAWINGS

Other objects and advantages of the invention will become apparent upon reading the following detailed description and upon reference to the accompanying drawings in which.

Figure 1:
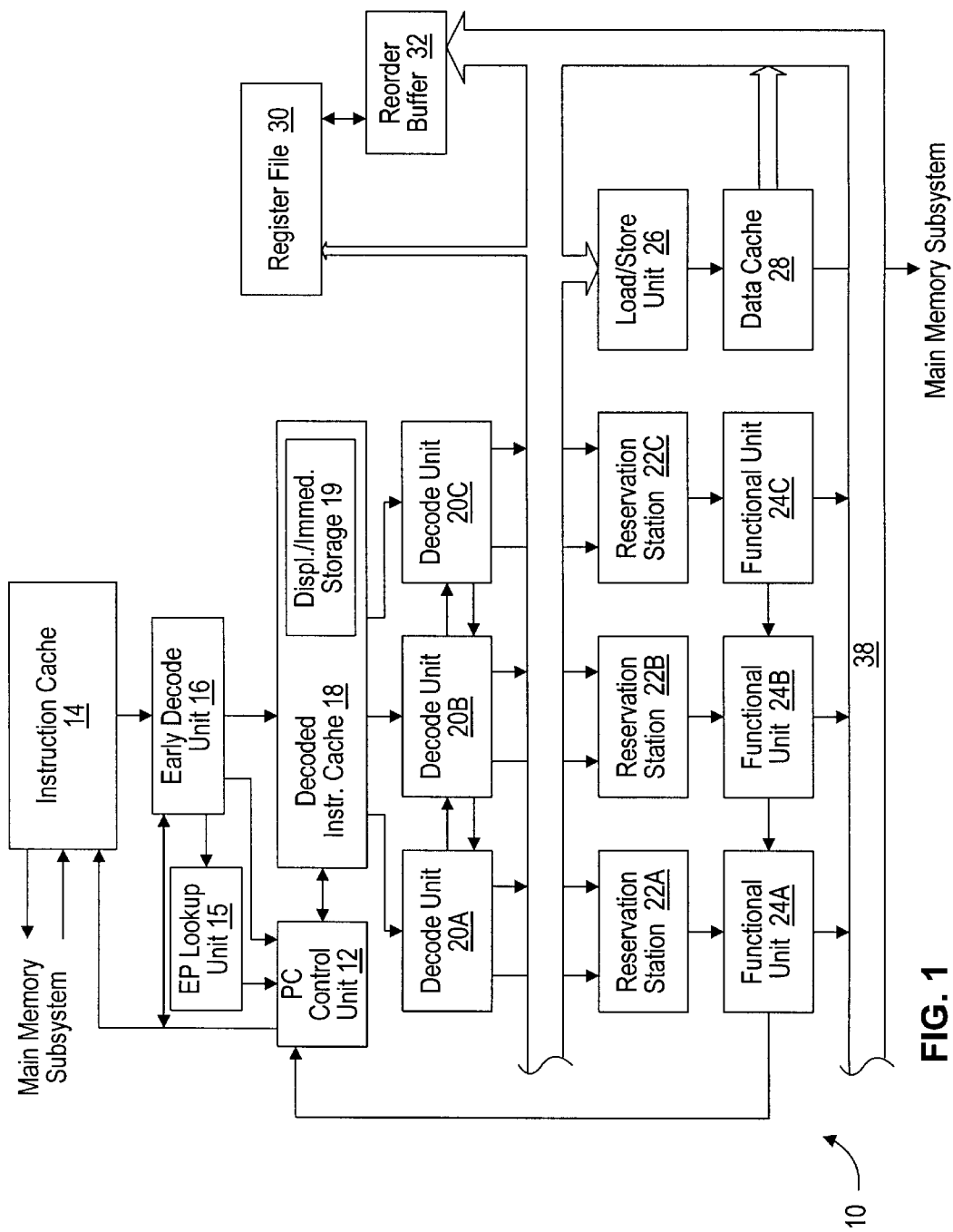
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a program counter (PC) control unit 12, an instruction cache 14, an entry point (EP) lookup unit 15, an early decode unit 16, a decoded instruction cache 18 (including displacement/immediate storage 19), a plurality of decode units 20A–20C, a plurality of reservation stations 22A–22C, a plurality of functional units 24A–24C, a load/store unit 26, a data cache 28, a register file 30, and a reorder buffer 32. Elements referred to herein with a particular reference number followed by a letter will be collectively referred to by the reference number alone. For example, decode units 20A–20C will be collectively referred to as decode units 20.

Instruction cache 14 is coupled to receive instructions from a main memory subsystem (not shown), and is further coupled to PC control unit 12 and early decode unit 16. Early decode unit 16 is coupled in turn to EP lookup unit 15, PC control unit 12, and decoded instruction cache 18. PC control unit 12 is further coupled to functional units 24, EP lookup unit 15, and decoded instruction cache 18. Decoded instruction cache 18 is also coupled to each of decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem.

Generally speaking, microprocessor 10 employs two levels of instruction cache: instruction cache 14, which includes cache lines of non-decoded groups of contiguous instruction bytes, and decoded instruction cache 18, which includes cache lines of partially decoded instructions aligned for concurrent dispatch to decode units 20. As used herein, "partially decoded" instructions represent an intermediate form between the form stored in memory and the fully decoded form of the instruction conveyed to one of reservation stations 22. Furthermore "partial decoding" and "decoding" are both used interchangeably herein to describe the operation of early decode unit 16.

Each cache line (also referred to as "cache entry") in decoded instruction cache 18 includes a first PC field corresponding to the PC value of the first instruction in the line. Upon receiving an initial fetch address (e.g., due to a branch misprediction), PC control unit 12 performs a fully associative lookup of these PC values within decoded instruction cache 18. If a hit is found for the fetch address, partially decoded instructions are concurrently conveyed to decode units 20 from the selected cache line. While the instructions within this line are dispatched, a next entry field within the cache line is conveyed to PC control unit 12. If this field is valid, the value of the next entry field determines the next access to decoded instruction cache 18. This next line is read, instructions within the line are dispatched to decode units 20, and the next entry field is conveyed to PC control unit 12. The above process repeats as long as the next entry field is valid.

If the next entry field is invalid or is determined to be incorrect for a given cache line, branch prediction information stored within the given cache line is employed to generate a next expected address corresponding to the next cache line. This next expected address is then conveyed by PC control unit 12 to decoded instruction cache 18 for a search of the first PC value of each cache line. If a hit is found at a particular location, instructions from this location are read from decoded instruction cache 18 and the process continues as described above. If the PC value misses in decoded instruction cache 18, the next expected address is conveyed to instruction cache 14 by PC control unit 12.

If instruction cache 14 includes this next expected address, a group of contiguous instruction bytes including this address is conveyed to early decode unit 16. Early decode unit 16 performs a partial decode of instructions within the conveyed instruction bytes, as well as generating branch prediction information. In one embodiment, early decode unit 16 conveys one partially decoded instruction to decoded instruction cache 18 per clock cycle. In an alternative embodiment, early decode unit 16 is configured to provide a plurality of instructions to decoded instruction cache 18 per clock cycle.

In one embodiment, decoded instruction cache 18 includes two types of cache lines. One type of cache line is configured to store a plurality of instructions that are directly executable by microprocessor 10. As used herein, "directly executable" refers to instructions that functional units 24 are capable of performing without external control (i.e., microcode). Directly executable instructions are typically executed in a single clock cycle. Directly executable instructions conveyed from early decode unit 16 are stared in "directly executable instruction cache lines". A directly executable instruction fetched from main memory is represented by one decoded instruction within decoded instruction cache 18.

The other type of cache line within decoded instruction cache 18 includes a plurality of microinstructions, which are predetermined directly executable instructions. Microinstructions performed in a sequence known as a microcode routine effectuate the operation of instructions not directly executable by microprocessor 10 (referred to herein as "microcode instructions"). Microprocessor 10 executes a corresponding microcode routine when a given microcode instruction is encountered in the instruction stream. A given microcode routine may include one or more cache lines, referred to as "microcode cache lines", within decoded instruction cache 18. Decoded instruction cache 18 also includes operand fields for each microcode routine which stores operands for a particular instance of a given microcode instruction. A microcode instruction fetched from main memory is thereby represented by at least two decoded instructions within decoded instruction cache 18.

In one embodiment, a cache line within decoded instruction cache 18 is selected based on the opcode of the first instruction located within the group of contiguous instruction bytes partially decoded by early decode unit 16. In microprocessor 10, a cache line is selected by using an entry point conveyed from EP lookup unit 15 in response to receiving an opcode from early decode unit 16. As used herein, "entry point" (EP) refers to a value conveyed to decoded instruction cache 18 which selects a particular cache line. If the first instruction is directly executable, it is stored in a directly executable cache line corresponding to the opcode of the first instruction. In one embodiment, more than one cache line may be provided for each directly executable instruction executed by microprocessor 10, depending upon the frequency of the instruction. Directly executable instructions subsequent to the first instruction in the group of contiguous instruction bytes conveyed by instruction cache 14 are also stored in the selected directly executable instruction cache line (up to a predetermined maximum number of entries). As described above, each directly executable instruction cache line also includes a first PC field and a next entry field.

If the first instruction is a microcode instruction, a microcode cache line within decoded instruction cache 18 is selected which corresponds to the opcode of the first instruction. This cache line includes predetermined microinstructions which, when executed, effectuate the operation of the first instruction. Since a microcode routine may be several lines long, the next entry field of the first microcode cache line may point to a subsequent microcode cache line which continues operation of the microcode routine.

When instructions are dispatched out of decoded instruction cache 18, the pipeline of microprocessor 10 is effectively shortened, since the conveyed instructions have already been scanned and aligned. This aids in recovery from branch misprediction if the actual target address of the branch instruction is located in decoded instruction cache 18. The branch misprediction penalty may thus be reduced over implementations in which non-aligned/non-decoded instructions are fetched from an instruction cache after a branch misprediction. An additional advantage of decoded instruction cache 18 is an effective implementation of microcode functionality by incorporating directly executable and microcode instructions into the same cache.

In one embodiment, decoded instruction cache 18 includes a displacement/immediate storage 19. Displacement and immediate fields are two operand types in instructions executable by microprocessor 10. Because both operands are relatively large (up to 32 bits each in the x86 instruction set), the size of decoded instruction cache 18 is greatly increased if each instruction includes a field for both of these operands. Since these operands are used relatively infrequently, a certain number of entries per cache line may be allotted for displacement and immediate values used by instructions in that line. If a displacement/immediate operand is detected and the displacement/immediate storage of the cache line is full, the instruction becomes the first instruction of another cache line, even if the cache line is not full of instructions.

Decode units 20 are configured to complete decode of instructions received from decoded instruction cache 18, while register operand information and other pipeline information is routed directly to reorder buffer 32 from decoded instruction cache 18. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from decoded instruction cache 18 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to PC control unit 12. Upon a branch misprediction, microprocessor 10 flushes instructions subsequent to the mispredicted branch that have entered the instruction processing pipeline, and causes a fetch of the required instructions from decoded instruction cache 18, instruction cache 14 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. It is understood that data cache 28 may be implemented in a variety of specific memory configurations, including a set associative configuration.

In one particular embodiment of microprocessor 10 employing the x86 microprocessor architecture, instruction cache 14 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
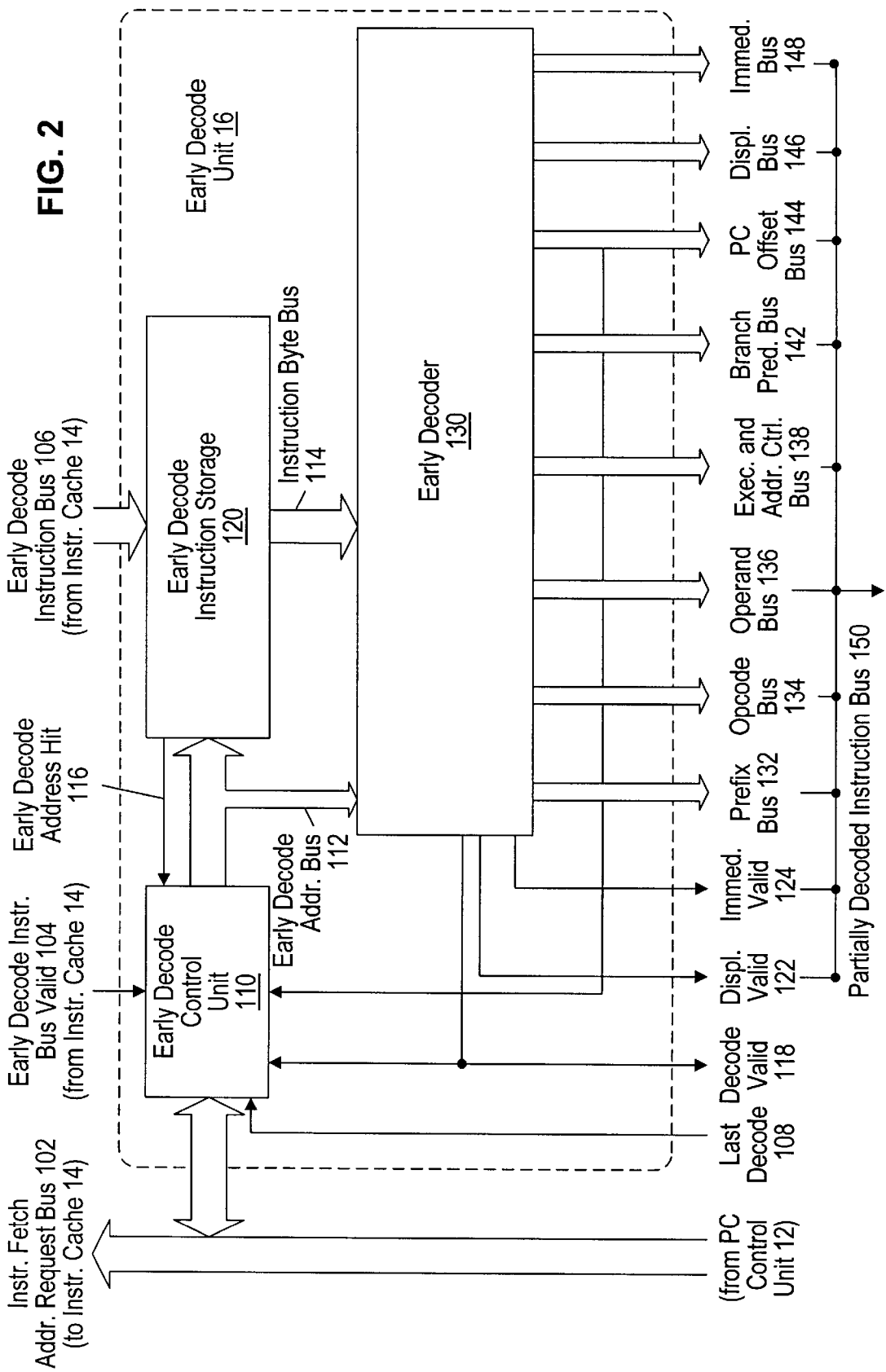
FIG. 2 is a block diagram of one embodiment of early decode unit 16.

Turning now to FIG. 2, a block diagram of one embodiment of early decode unit 16 is shown. As depicted, early decode unit 16 includes an early decode control unit 110, an early decode instruction storage 120, and an early decoder 130. Early decode control unit 110 is coupled to instruction cache 14 via an instruction fetch address request bus 102 and an early decode instruction bus valid signal 104. Early decode control unit 110 further receives a last decode signal 108 from PC control unit 12 and a decode valid signal 118 from early decoder 130. Early decode control unit 110 is connected to early decode instruction storage 120 and early decoder 130 via an early decode address bus 112. Early decode instruction storage 120 is further coupled to receive an early decode instruction bus 106 and convey instruction bytes on an instruction byte bus 114 in response to signals received on early decode address bus 112. Early decode instruction storage 120 is also coupled to convey an early decode address hit 116 to early decode control unit 110. Early decoder 130 receives instruction byte bus 114 and conveys a decode valid signal 118 and partial decode information on a partially decoded instruction bus 150. Decode valid signal 118 is coupled to EP lookup unit 15 and PC control unit 12. Partially decoded instruction bus 150 is conveyed to decoded instruction cache 18 and PC control unit 12, and comprises a displacement valid signal 122, an immediate valid signal 122, a p refix bus 132, an opcode bus 134, an operand bus 136, an execution and address control bus 138, a branch prediction bus 142, a PC offset bus 144, a displacement bus 146, and an immediate bus 148. PC offset bus 144 is also conveyed to early decode control unit 110.

As described above, when a desired instruction address is not detected in decoded instruction cache 18 by PC control unit 12, the instruction address is conveyed on instruction fetch address request bus 102 to instruction cache 14 and early decode control unit 110. If the instruction address hits in instruction cache 14, a group of contiguous instruction bytes corresponding to the instruction address is conveyed to early decode instruction storage 120 within early decode unit 16. Addition ally, early instruction bus valid signal 104 is asserted to early decode control unit 110, indicating the contents of early decode instruction bus 106 are valid. If the instruction address misses in instruction cache 14, a group of contiguous instruction bytes corresponding to the instruction address is requested from main memory. Upon retrieval from memory, these bytes are stored in instruction cache 14 and conveyed on early decode instruction bus 106 to early decode unit 16. Early decode instruction bus valid 104 is likewise asserted.

Upon receiving a valid group of instruction bytes on early decode instruction bus 106, early decode unit 16 conveys a fixed number of instruction bytes to early decoder 130 on instruction byte bus 114. This is done by presenting the address requested from instruction cache 14 (on instruction fetch address request bus 102) to early decode instruction storage 120 upon early decode address bus 112. Early decode address hit 116 will be asserted if early decode instruction storage 120 includes one or more of the bytes beginning at the address specified on early decode address bus 112. Since the desired instruction may not be aligned with the start of the group of instruction bytes conveyed on early decode instruction bus 106, the fixed number of instruction bytes conveyed to early decode unit 130 may begin at some offset within the group of instruction bytes conveyed on early decode instruction bus 106. The address on early decode address bus 112 is additionally conveyed to early decoder 130, and is used in branch prediction generation as will be described below.

In one embodiment, instruction byte bus 114 may convey a number of instruction bytes equal to or greater than the length of a typical instruction executed by microprocessor 10. If the offset portion of the address conveyed on early decode address bus 112 is such that some of the requested bytes are located beyond the boundary of the group of instruction bytes received from instruction cache 14, the remaining bytes are provided during a subsequent clock cycle. The remaining bytes are included in a fetch from instruction cache 14. Early decoder 130 de-asserts decode valid signal 118 until it receives enough bytes to perform a valid decode.

Early decoder 130 performs a partial decoding of one instruction supplied from instruction bytes on instruction byte bus 114. In the embodiment of early decode unit 16 shown in FIG. 2, early decoder 130 is configured to generate various decoded fields corresponding to the x86 instruction set. Early decoder 130 has several functions. First, the prefix bytes of the instruction are merged to a single byte. (If more than four prefix bytes are present, this operation may take one additional clock cycle for each extra four prefix bytes). The resulting merged prefix byte is conveyed on prefix bus 132. The opcode of the instruction is conveyed on opcode bus 134 after decoding. Opcode bus 134 is conveyed not only to decoded instruction cache 18, but also to EP lookup unit 15 to determine an entry point for decoded instruction cache 18 if the instruction is the first in the line being retrieved. Furthermore, source and destination operand information is conveyed on operand bus 136. Execution and address control bus 138 may include a variety of information, including source and destination flags as well as address and execution modes. Furthermore, execution and address control bus 138 may include an indication of whether the instruction is a microcode instruction (as opposed to a directly executable instruction), and also an indication of whether the instruction is a branch instruction. Displacement and immediate fields are conveyed on displacement bus 146 and immediate bus 148, respectively.

Additionally, early decoder 130 generates branch prediction information. As will be described below, branch prediction information within decoded instruction cache 18 includes a prediction of branch direction (taken/not-taken), a target address of a branch, and a sequential offset for the line, indicating the offset that should be added to the PC of the current line to fetch the next sequential instruction. The prediction of branch direction may be generated statically based on the type of branch, while the target address of the branch may be calculated from the PC of the beginning of the line (provided on early decode address bus 112), the offset of the branch (calculated by early decoder 130), and an immediate or displacement field. This information is conveyed on branch prediction bus 142.

Early decoder 130 conveys partially decoded instructions to decoded instruction cache 18 until last decode signal 108 is asserted. Decoded instruction cache 18 buffers these partially decoded instructions until a sufficient number of instructions have been provided for a cache line. Decoded instruction cache 18 then asserts last decode signal 108. This indicates either that a sufficient number of instructions have been provided to fill a line within decoded instruction cache 18 or that one of a number of conditions has been detected which causes a line in decoded instruction cache 18 not to be completely filled. After a particular instruction has been partially decoded, early decode control unit 110 thus requests a number of instruction bytes from early decode instruction storage 120 for decoding of a new instruction. Early decoder 130 computes the length of each instruction processed, conveying this length on PC offset bus 144. Early decode control unit 110 uses this value to calculate a next address to begin requesting instruction bytes. Additionally, this value is conveyed to decoded instruction cache 18 with each partially decoded instruction. When a line is written to decoded instruction cache 18, this value represents the length of the line in bytes. This value is stored in the branch prediction storage in order to generate a sequential PC value if needed.

Each cache line within decoded instruction cache 18 is configured to store a plurality of partially decoded instructions. When an address is requested on instruction fetch address request bus 102, early decoder 130 first decodes the instruction residing at the desired address. Decoded instruction cache 18, via PC control unit 12, continues to request decoded instructions from early decode unit 16 until one of four conditions is detected: 1) a number of instructions equal to the capacity of a cache line in decoded instruction cache 18 has been provided, 2) a branch instruction is detected, 3) a microcode instruction is detected, and 4) an instruction is detected which requires an amount of displacement/immediate storage 19 which cannot be provided in the current cache line.

In the case of 1), an address is presented by PC control unit 12 to instruction cache 14. This request is satisfied, with the resulting instruction bytes conveyed to early decode unit 16. Early decoder 130 then conveys one partially decoded instruction at a time until the maximum number of partially decoded instruction per cache line has been reached. PC control unit 12 then asserts last decode signal 108 indicating further decodes are not required. The fetched instructions are then conveyed to subsequent pipeline stages of microprocessor 10 for execution.

In one embodiment of decoded instruction cache 18, a decoded instruction cache line may include up to one branch (thus simplifying branch prediction logic). Thus when condition 2) is detected (by PC control unit 12 receiving a signal on execution and address control bus 138 in one embodiment), PC control unit 12 asserts last decode signal 108. This causes the branch instruction to be written as the last instruction in the cache line, even if additional unused entries remain. Other embodiments may support more than one branch per line.

In one embodiment of decoded instruction cache 18, directly executable instructions and microcode instructions are stored in separate cache lines. Thus when condition 3) is detected (by PC control unit 12, which receives a microcode indication on execution and address control bus 138 in one embodiment), PC control unit 12 asserts last decode signal 108. Directly executable instructions which have already been conveyed to decoded instruction cache 18, but have not yet been stored, are written to a selected directly executable cache line. Subsequently, operand information from the microcode instruction is stored to a selected microcode cache line. If a microcode instruction is the first instruction detected, only the microcode instruction is written to decoded instruction cache 18.

Because displacement and immediate operands are used infrequently and require a large amount of storage (up to 32 bits each), each cache line in decoded instruction cache 18 has a corresponding 64-bit entry in displacement/immediate storage 19, configured to store one displacement value and one immediate value in one embodiment. There thus arises the possibility that an instruction provided by early decoder 130 will require displacement/immediate storage 19 which is not available because it has already been used by a previous instruction in the line. This is condition 4) described above. In one embodiment, the cache line is terminated with the instruction prior to the one with the displacement/immediate storage conflict (this instruction eventually becomes the first instruction in a new cache line, and thus will have access to a full 64 bits of storage in displacement/immediate storage 19).

In the cases described above where a given cache line is not completely full, unused entries may be loaded into the cache as no-ops or denoted as invalid.

Figure 3:
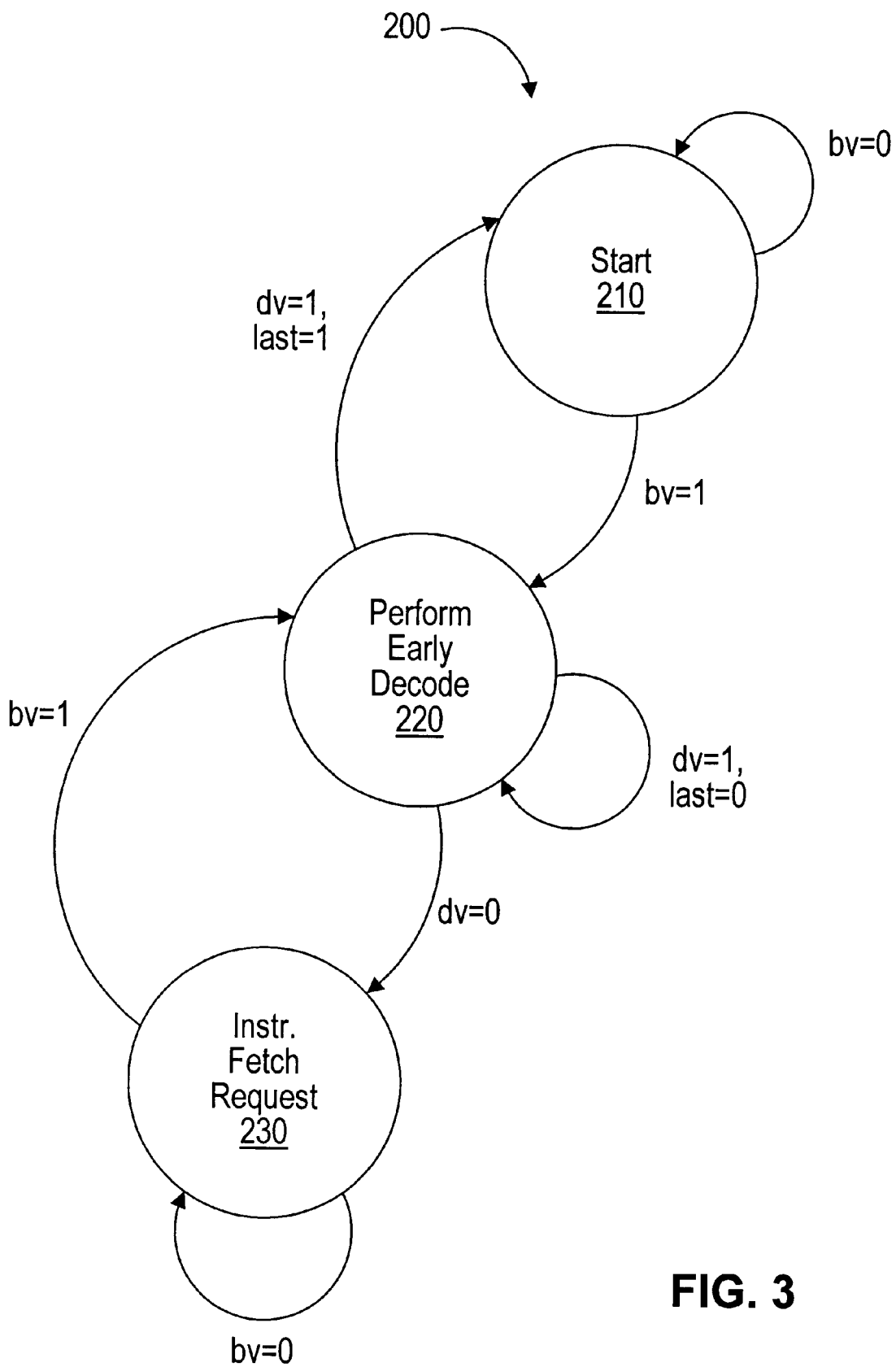
FIG. 3 illustrates a state machine 200 depicting operation of one embodiment of early decode unit 16.

Turning now to FIG. 3, one embodiment of a state machine 200 which depicts operation of early decode unit 16 is shown. State machine 200 includes a start state 210, a perform early decode state 220, and a instruction fetch request state 230. Transitions in FIG. 3 are labeled "bv", "dv", and "last". The "bv" label corresponds to early decode instruction bus valid signal 104, which indicates (when asserted) that early decode instruction bus 106 is valid. The "dv" label corresponds to decode valid signal 118, while the "last" label corresponds to last decode signal 108.

State machine 200 remains in start state 210 until valid instruction bytes are received on early decode instruction bus 106. In this case, early decode instruction bus valid signal 104 is asserted, causing state machine 200 to transition to perform early decode state 220. An early decode is attempted as described above. If sufficient bytes are present to perform the decode, decode valid signal 108 is asserted. If insufficient bytes are present, decode valid signal 118 is de-asserted, and state machine 200 enters instruction fetch request state 230. In state 230, additional instruction bytes are requested from instruction cache 14. When these bytes are valid, state 220 is re-entered, and early decode is attempted again. If decode is now successful, decode valid signal 118 is asserted. If PC control unit 12 does not detect any conditions as described above which terminate a cache line, last decode signal 108 is de-asserted and state machine 200 remains in state 220. If last decode signal 108 is asserted by PC control unit 12, state machine 200 returns to start state 210.

Figure 4:
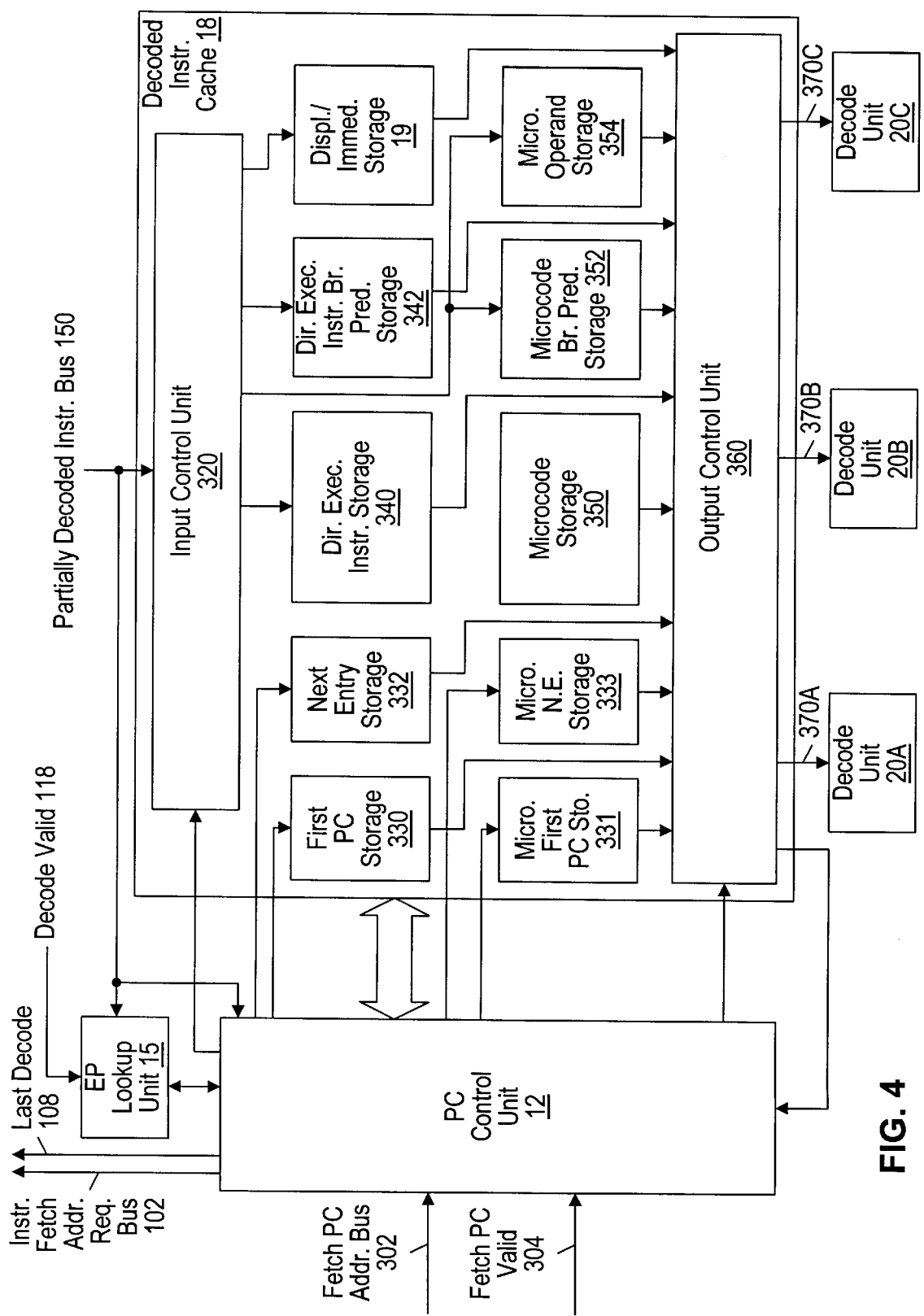
FIG. 4 is a high-level block diagram of one embodiment of PC control unit 12, EP lookup unit 15, and decoded instruction cache 18.

Turning now to FIG. 4, a high-level block diagram of one embodiment of PC control unit 12, EP lookup unit 15, and decoded instruction cache 18 is shown. As depicted, EP lookup unit 15 receives decode valid signal 118 and portions of partially decoded instruction bus 150 from early decode unit 116, and is coupled to PC control unit 12. PC control unit 12 receives a fetch PC address bus 302, along with a fetch PC valid signal 304, and conveys instruction fetch address request bus 102 and last decode signal 108 as outputs. Additionally, PC control unit 12 is coupled to decoded instruction cache 18.

Decoded instruction cache 18 receives partially decoded instruction bus 150 from early decode unit 16, and conveys partially decoded instructions on partial decode output buses 370 to a corresponding one of decode units 20. Decoded instruction cache 18 includes an input control unit 320, a first PC storage 330, a microcode first PC storage 331, a next entry storage 332, a microcode next entry storage 333, a directly executable instruction storage 340, a directly executable instruction branch prediction storage 342, displacement/immediate storage 19, a microcode storage 350, a microcode branch prediction storage 352, a microcode operand storage 354, and a output control unit 360.

Upon initial operation of microprocessor 10, decoded instruction cache 18 includes no valid instructions. An address, representing a branch target or exception address is conveyed to PC control unit 12 from reorder buffer 32 on fetch PC address bus 302, along with corresponding valid signal fetch PC valid 304. This address is presented to decoded instruction cache 18 for a lookup operation. The lookup operation consists of a comparison between the first PC value of each cache line and the lookup PC value.

The PC value stored in the first PC field of decoded instruction cache 18 may either be a logical address or a linear address. If a logical address is used for the PC value, the actual target address of a branch (which is also a logical address in one embodiment of microprocessor 10) may be directly compared in the lookup operation. Additional hardware is then employed to invalidate all entries in decoded instruction cache 18 when a new code segment register is used. If linear addresses are stored in the first PC field of decoded instruction cache 18, the lookup operation may require additional clock cycles while a logical address conveyed by a branch misprediction is converted to a linear address.

Since no entries are valid initially, the lookup misses, causing PC control unit 12 to assert instruction fetch address request bus 102 to instruction cache 14. Early decode unit 16 receives the corresponding instruction bytes, and provides partially decoded instructions via partially decoded instruction bus 150. As these instructions are provided to decoded instruction cache 18, they are stored in a holding register within input control unit 320, under the control of PC control unit 12. Ultimately, a condition is detected which causes PC control unit 12 to assert last decode signal 108 as described above.

At this point, the partially decoded instructions in the holding register within input control unit 320 are ready to be stored to a cache line within decoded instruction cache 18. In one embodiment, this cache line is selected based on the opcode of the first instruction within the group of instructions to be written into decoded instruction cache 18. Opcode bus 134 (part of partially decoded instruction bus 150) and decode valid signal 118 are connected to EP lookup unit 15. EP lookup unit 15 calculates predetermined entry points to decoded instruction cache 18 for each instruction opcode. In one embodiment, decoded instruction cache 18 may include more than one entry point for a given instruction depending upon its frequency of usage.

EP lookup unit 15 conveys an entry point for each valid opcode received on opcode bus 134. PC control unit 12 saves the entry point corresponding to the first instruction within the holding register within input control unit 320. When the cache line is ready for storage to decoded instruction cache 18, the particular entry is selected based on the entry point saved by PC control unit 12.

As described above, decoded instruction cache 18 stores directly executable and microcode instructions in separate cache lines. When a cache line to be stored includes directly executable instructions, these instructions will be written to a selected cache line in directly executable instruction storage 340. Additionally, a first PC storage entry corresponding to the cache line is also stored, along with branch prediction information, which is stored in directly executable instructions branch prediction storage 342. Displacement and/or immediate data, if present, is conveyed to a corresponding entry within displacement/immediate storage 19.

For each microcode instruction executable by microprocessor 10, a predetermined microcode routine, comprising a plurality of directly executable instructions, is pre-stored into microcode storage 350. Additionally, predetermined branch (or "microbranch") prediction information is prestored within microcode branch prediction storage 352. (These storage locations may be implemented as read-only memory (ROM), or as random-access memories (RAM) using data uploaded from a ROM). A subset of the information stored for a directly executable instruction is stored for microcode instructions in decoded instruction cache 18. In one embodiment, microcode operand information is stared to microcode operand storage 354, providing the appropriate operands for execution of the particular microcode instruction. Additionally, a PC value is stored to first PC storage 330 location corresponding to the first line of the microcode routine. In one embodiment, two PC values may be maintained for the first cache line of a microcode routine in order to perform lookup operations on both microcode and non-microcode addresses.

When a new cache line is stored to a selected entry point within decoded instruction cache 18, input control unit 320 also conveys these instructions to decode units 20 for subsequent execution. In one embodiment, directly executable instructions are conveyed to decode units 20 one at a time as each instruction is received from early decode unit 16. In a different embodiment, the directly executable instructions being loaded are first written to a cache line, then multiple instructions from the cache line are conveyed concurrently to decode units on one or more of partial decode output buses 370. When a microcode instruction is conveyed to decoded instruction cache 18, a plurality of microinstructions are dispatched to decode units 20 after the operand information of the microcode instruction is stored.

In one embodiment, the maximum number of entries in a cache line within decoded instruction cache 18 may be larger than the number of decode units 20. In such an embodiment, output control unit 360 may employ more than one clock cycle to dispatch all instructions in a cache line. This gives PC control unit 12 additional time to generate an entry point for a next access to decoded instruction cache 18.

When instructions are conveyed to one or more of decode units 20, next entry and branch prediction information is conveyed to PC control unit 12 to generate a next entry point for decoded instruction cache 18. Each cache line includes next entry storage: next entry storage 332 or microcode next entry storage 333. Initially, each of the locations within next entry storage 332 is invalid. As will be described below, these entries become valid as the cache fills during program execution. Microcode next entry storage 333 is slightly different, however. Since microcode routines are predetermined, each of the next entry fields may be prestored, with the exception of the next entry field corresponding to the last cache line of the microcode routine. This last next entry field points to the next decoded instruction cache line storing the instruction sequence subsequent to the microcode instruction within the program sequence being executed.

The next entry field corresponding to a line of dispatched instructions may be valid or invalid. If a next entry field is valid, it is conveyed to PC control unit 12 along with the expected PC value. The next entry is read from the specified cache line within decoded instruction cache 18. The first PC value from the specified cache line is then compared to the expected PC value in order to insure the correct line has been fetched. If the values match, instructions from the specified cache line are conveyed on partial output decode buses 370. If there is a miscompare between the values, a lookup operation is performed using the expected PC, and instructions from the specified cache line are not conveyed on partial output decode buses 370.

If the entry is invalid, the next step is to search decided instruction cache 18 for the expected PC of the next cache line. The expected PC is generated using prediction information generated by early decode unit 16. As with addresses provided upon fetch PC address bus 304, an associative lookup in first PC storage 330 is performed using the expected PC. If a hit is found, instructions from the cache line corresponding to the expected PC are conveyed to output control unit 360. Additionally, an update operation may be performed on the next entry field of the previous cache line, causing it to point to the entry returned by the lookup operation. In this manner, a lookup operation may not be required the next time the previous cache line is subsequently executed.

Operation proceeds out of decoded instruction cache 18 as long as a) valid entries are provided in the next entry field and b) PC lookups are successful in the event of branch mispredictions or invalid next entry fields. Decoded instruction cache 18 may result in a reduced branch misprediction penalty if the actual target address of the branch is located successfully by a PC lookup operation. In this case, aligned instructions are already available to be dispatched to decode units 20, eliminating the need for predecoding and alignment. The pipeline is effectively shortened when microprocessor 10 hits in decoded instruction cache 18.

Figure 5:
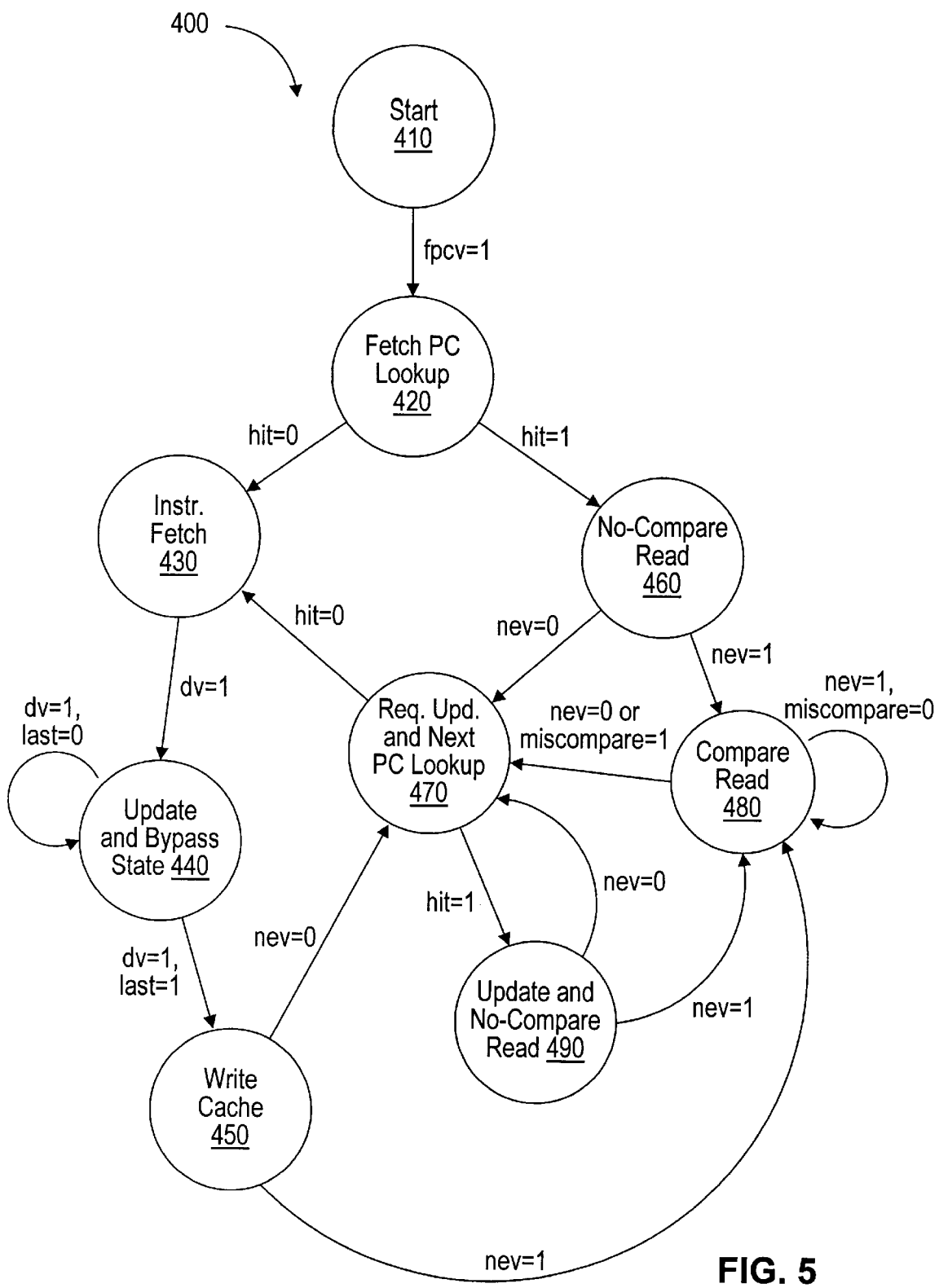
FIG. 5 illustrates a state machine depicting operation of one embodiment of PC control unit 12.

Turning now to FIG. 5, a state machine depicting operation of one embodiment of PC control unit 12 is shown. State machine 400 includes a start state 410, a fetch PC lookup state 420, an instruction fetch state 430, an update and bypass state 440, a write cache state 450, a no-compare read state 460, a request update and next PC lookup state 470, a compare read state 480, and a update and no-compare state 490. Transitions in FIG. 5 are labeled "fpcv", "hit", "nev", "dv", "last", and "miscompare". The "fpcv" label corresponds to fetch PC valid signal 304, which indicates the address on fetch PC address bus 302 is valid. The "hit" label refers to the result of the lookup operations performed in fetch PC lookup state 420 and request update and next PC lookup state 470. The "nev" label corresponds to a next entry pointer within a cache line being valid. The "dv" label refers to decode valid signal 118, while "last" refers to last decode signal 108. Finally, the "miscompare" label refers to a miscompare being detected between the expected PC value and the first PC value of a cache line read from decoded instruction cache 18.

Initially, state machine 400 remains in state 410 until a valid fetch address is received on fetch PC address bus 302, causing a transition to fetch PC lookup state 420. In state 420, an associative lookup is performed of the first PC values in decoded instruction cache 18. If the lookup is successful, state machine 400 enters no-compare read state 460. On a successful lookup, however, state machine 400 transitions to instruction fetch state 430. While not explicitly shown in FIG. 5, a valid fetch PC address bus 302 (received as the result of a branch misprediction, for example) also causes a transition to state 420 from each state in state machine 400. The current operation when a branch misprediction (or other exception) is detected is discarded, and state machine 400 continues operation at state 420.

If the lookup operation in state 420 is successful, no-compare read state 460 is entered. A "no-compare" read indicates that the instructions from the cache line selected by the lookup operation are conveyed to decode units 20 without verifying that the first PC field of the cache line matches the expected PC (this has already been verified by the lookup operation). If the next entry pointer of the cache line is valid, state machine 400 enters compare read state 480. Alternately, state machine 400 transitions to request update and next PC lookup state 470 on an invalid next pointer entry.

If the lookup operation in state 420 is unsuccessful, a request for the address miss is made in instruction fetch state 430. (Alternately, the instruction cache 14 lookup may be performed concurrently with the lookup in decoded instruction cache 18). The instruction bytes are returned either from instruction cache 14 or main memory. When the first instruction is conveyed to decoded instruction cache 18 from early decode unit 16, decode valid signal 118 is asserted and state machine 400 enters update and bypass state 440. In this state, an update of a next entry pointer field of a previous cache line may be updated if such an update was requested (instruction fetch state 430 was entered via state 470). Also in state 440, the instruction returned by early decode unit 16 is conveyed to the holding register in input control unit 320 (for subsequent storage to a line in decoded instruction cache 18) if the instruction is directly executable. In the case of a microcode instruction, instruction operand information is written to the cache as state machine 400 enters write cache state 450. Furthermore, directly executable instruction are forwarded to output control unit 360 for dispatch to decode units 20. As long as non-cache-line-terminating instructions are received by decoded instruction cache 18, state machine 400 remains in update and bypass state 440 (although the update operation is only performed once during a write of a given cache line). When a cache-line-terminating instruction is received by decoded instruction cache 18 (as indicated by last decode signal 108), state machine 400 transitions to write cache state 450.

If a microcode instruction causes the transition to write cache state 450, any directly executable instructions in the holding register in input control unit 320 are stored to decoded instruction cache 18, followed by the microcode instruction. If directly executable instructions are written before the microcode instruction, the directly executable instructions have already been conveyed to decode units 20 in update and bypass state 440. The state of the next entry pointer of the directly executable cache line determines the next state of state machine 400. If the next entry pointer is valid, state machine 400 transitions to compare read state 480; otherwise, state machine 400 enters request update and next PC lookup state 470.

If a directly executable instruction causes the transition to write cache state 450, the directly executable instructions in the holding register are written to decoded instruction cache 18. These directly executable instructions have already been conveyed to decode units 20 in update and bypass state 440 as described above. The state of the next entry pointer of the directly executable cache line determines the next state of state machine 400. If the next entry pointer is valid, state machine 400 transitions to compare read state 480; otherwise, state machine 400 enters request update and next PC lookup state 470.

In compare read state 480, instructions are read from a cache line identified by the next entry pointer of the current cache line. These instructions are forwarded to decode units 20 via output control unit 360 if the expected PC matches the first PC value of the cache line. If the PC values do not match, request update and next PC lookup state 470 is entered. A lookup and update is requested for the expected PC value. If the lookup is successful, an update and read is performed in update and no-compare read state 490. If the lookup is unsuccessful, the cache line corresponding to the expected PC is retrieved in instruction fetch state 430.

If the expected PC value matches the first PC value in compare read state 480, state machine 400 remains in state 480 if the next entry pointer value of the current cache line is valid. Request update and next PC lookup state 470 is entered if the next entry pointer is invalid.

Figure 6:
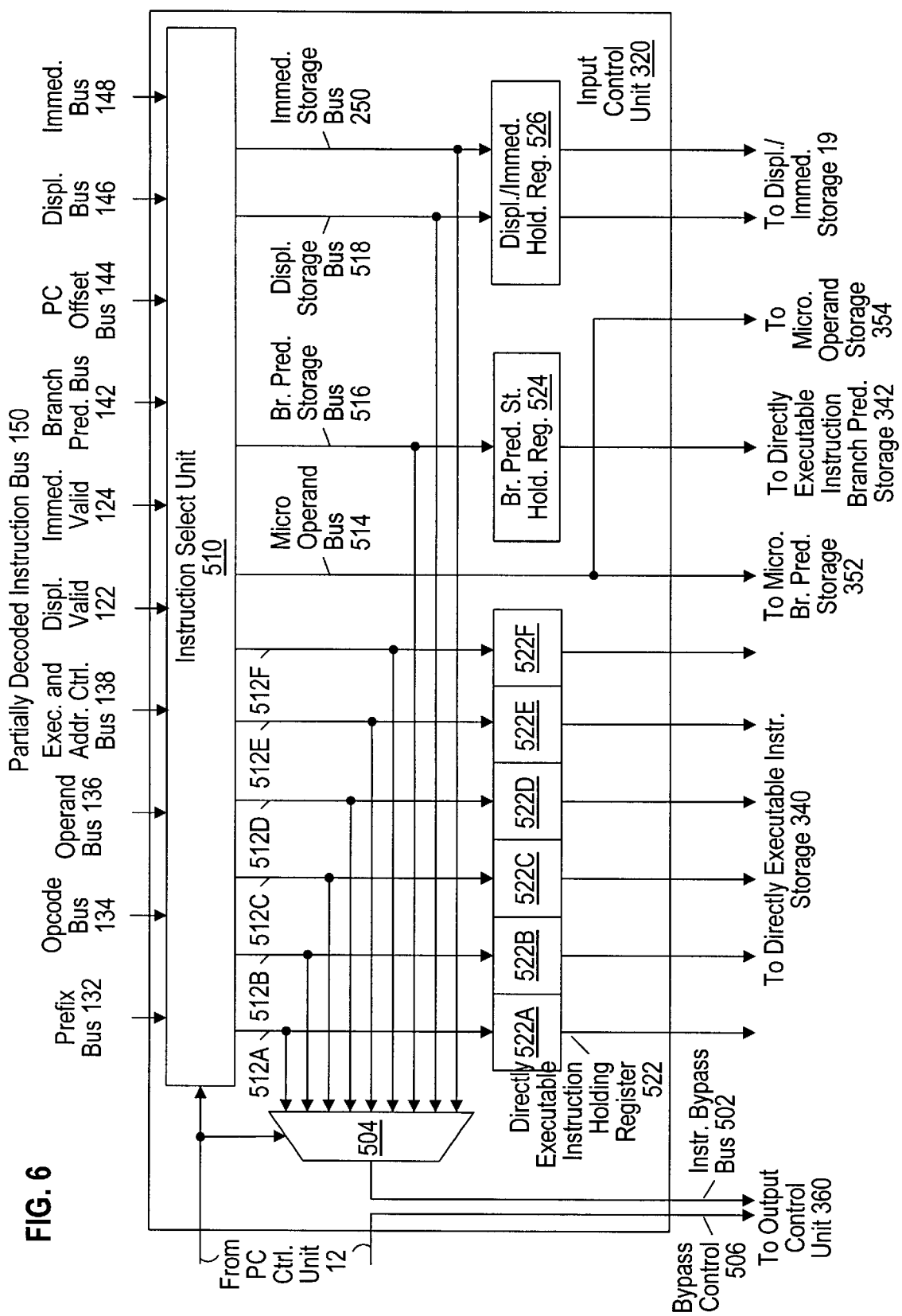
FIG. 6 is a block diagram of one embodiment of input control unit 320.

Turning now to FIG. 6, a block diagram of one embodiment of input control unit 320 is shown. As depicted, input control unit 320 includes an instruction bypass multiplexer 504, an instruction select unit 510, a directly executable instruction holding register 522 (including fields 522A–F), a branch prediction storage holding register 524, and a displacement/immediate holding register 526. Instruction select unit 510 receives partially decoded instruction bus 150 and control signals from PC control unit 12. In response, instruction select unit 510 conveys partial decode buses 512A–F to instruction bypass multiplexer 504 and directly executable instruction holding register 522. Additionally, instruction select unit 510 is connected to microcode branch prediction storage 352 and microcode operand storage 354 via a microcode operand bus 514, branch prediction storage holding register 524 via a branch prediction storage bus 516, and to displacement/immediate holding register 526 via a displacement storage bus 518 and an immediate storage bus 520, respectively. Directly executable instruction holding register 522, branch prediction storage holding register 524, and displacement/immediate holding register 526 are coupled to directly executable instruction storage 340, directly executable instruction branch prediction storage 342, and displacement/immediate storage 19, respectively. Instruction bypass multiplexer 504 receives partial decode buses 512A–F, branch prediction storage bus 516, displacement storage bus 518, and immediate storage bus 520, and conveys partial decoded information on an instruction bypass bus 502 in response to selection control provided by PC control unit 12. A bypass control signal 506 is conveyed to output control unit 360 to provide a selection signal for instruction bypass bus 502.

Early decode unit 16 supplies partially decoded instructions on partially decoded instruction bus 150 to decoded instruction cache 18 until last decode signal 108 is asserted by PC control unit 12. Each of these instructions is loaded into instruction select unit 510 under control provided by PC control unit 12. The instruction is then routed to either a plurality of holding registers or microcode storage depending on whether the partially decoded instruction is directly executable.

If the partially decoded instruction in instruction select unit 510 is directly executable, the various components of the instruction are routed to directly executable holding register 522, branch prediction storage holding register 524, and displacement/immediate holding register 526. Directly executable instruction holding register 522 includes a plurality of storage locations (522A–F). Each of these storage locations includes prefix information, an opcode, operand information, execution and address control information, and an indication of whether the instruction employs displacement or immediate operands. For each partially decoded instruction conveyed by early decode unit 16, the decode information is routed to one of locations 522A–F based upon values provided by PC control unit 12. For example, the first partially decoded, directly executable instruction resulting from an instruction fetch is stored into location 522A. Subsequent directly executable instructions are stored in subsequent locations within directly executable instruction holding register 522.

The information conveyed to branch prediction storage holding register 524 on branch prediction storage bus 516 is shared by the one or more instructions in the cache line. This information includes a branch prediction, a target address, and a sequential offset. The branch prediction is sequential until a branch prediction is encountered, at which point the prediction may be either sequential (branch not-taken) or branch-taken. The target address is not used unless a branch is detected in the line, and the sequential offset is used by next PC control unit 12 to calculate the sequential PC. In one embodiment, each cache line in decoded instruction cache 18 includes up to one branch per line. Accordingly, branch prediction storage holding register 524 may be overwritten as it receives new information.

Displacement/immediate storage 19 includes a storage location for a displacement value and an immediate value that are used as operands by the instructions in the cache line. Information is conveyed to storage 19 via displacement storage bus 518 and immediate storage bus 520. If an instruction is received by instruction select unit 510 which requires displacement or immediate storage already occupied, PC control unit 12 detects this condition and terminates the cache line before writing the requesting instruction to holding registers 522, 524, and 526.

PC control unit 12 causes the contents of holding registers 522, 524, and 526 to be written to a selected cache line when a directly executable cache line is completely loaded into the holding registers. Directly executable instruction holding register 522 is stored to an entry in directly executable instruction storage 340; branch prediction storage holding register 524 is stored to a corresponding entry in directly executable instruction branch prediction storage 342; and displacement/immediate holding register 526 is stored to a corresponding entry in displacement/immediate storage 19. Additionally, PC control unit 12 conveys a PC value corresponding to the first instruction that is stored into a first PC entry field within the selected cache line. The next entry field of the cache may not be updated unless the next cache line is already known.

In one embodiment, as instruction decode information is routed to holding registers 522, 524, and 526 for directly executable instructions, this information is also routed to output control unit 360 for dispatch to decode units 20. This may be done to forward fetched instructions into the pipeline as quickly as possible. To this end, as instructions are routed to holding registers 522, 524, and 526, one instruction is selected by instruction bypass multiplexer 504 by control signals from PC control unit 12. Instruction bypass multiplexer 504 conveys instruction bypass bus 502 to output control unit 360.

If the partially decoded conveyed to instruction select unit 510 corresponds to a microcode instruction, any directly executable instructions already within holding registers 522, 524, and 526 are first written to directly executable storage locations as described above. Note that in this case, the next entry field of the directly executable cache line may be written since it is already known that the next cache line is the microcode cache line (whose entry point is known). Next, PC control unit 12 causes selected operand information from instruction select unit 510 to be conveyed on microcode operand bus 514 to a selected entry within microcode branch prediction storage 352 and microcode operand storage 354.

The information stored to microcode branch prediction storage 352 may include branch information to be employed in selecting the next cache entry after completing the microcode routine. Since this information is stored in the last cache line within the routine, the offset of the selected cache line may need to be offset to write to the correct location. The information stored in microcode operand storage 354 is operand information employed by the microinstructions in microcode storage 350 to effect operation of the microcode instruction. Additionally, a PC value is stored to a corresponding location in microcode first PC storage 331. Note that, in one embodiment, next entry storage 332 may not be updated for the last cache line in the microcode routine since the next instruction may not yet be known.

Figure 7:
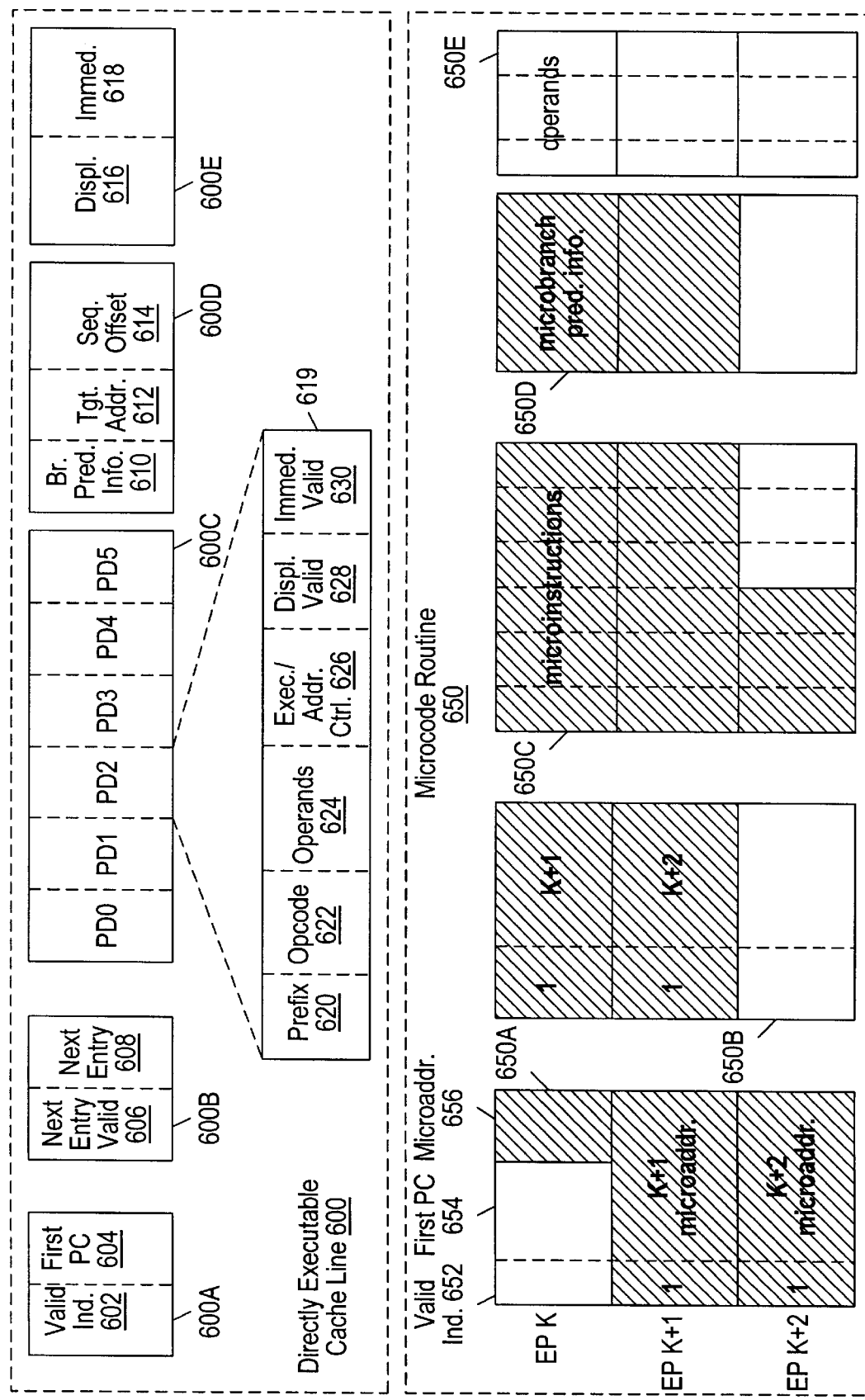
FIG. 7 is a block diagram of one embodiment of a directly executable cache line and a microcode routine within decoded instruction cache 18.

Turning now to FIG. 7, one embodiment of directly executable cache line 600 and microcode routine 650 are shown. Directly executable cache line 600 includes first PC entry 600A, next entry storage location 600B, directly executable instruction entry 600C, directly executable branch prediction storage entry 600D, and displacement/immediate storage entry 600E. Microcode routine 650 includes a plurality of microcode first PC storaae entries 650A, plurality of microcode next entry storage locations 650B, plurality of microinstruction cache lines 650C, plurality of microcode branch prediction storage entries 650D, and plurality of microcode operand storage entries 650E. A first cache line within microcode routine 650 is identified by entry point "K", while succeeding lines in routine 650 are located at entry points "K+1" and "K+2". Entries in microcode routine 650 shown as shaded indicate these entries are pre-stored and thus read-only.

First PC entry 600A includes a valid indication 602 and a first PC value 604. Valid indication 602 and first PC value 604 are set when PC control unit 12 writes a directly executable cache line in decoded instruction cache 18. First PC entry 600A is also accessed by the lookup operation. Next entry storage location 600B includes a next entry valid field 606 and a next entry field 608. These values are set by the update operation, and are conveyed as next entry information on a read operation.

Directly executable instruction entry 600C includes a plurality of partially decoded instructions ("PD0–PD5"). A partially decoded instruction 619 is shown in an exploded view. Partially decoded instruction 619 includes prefix field 620, opcode 622, operand field 624, execution and address control field 626, displacement valid field 628, and immediate valid field 630. Directly executable instruction branch prediction storage entry 600D includes branch prediction information 610, target address 612, and sequential offset 614. Finally, displacement/immediate storage entry 600E includes displacement entry 616 and immediate entry 618.

It is noted that in an alternate embodiment, the displacement and immediate values in displacement/immediate storage 19 may not be fixed-length. Rather, these values may be variable-length. Displacement valid field 628 and immediate valid field 630 may then additionally include select enables which specify a start location and a number of bytes within the corresponding displacement/immediate storage 19 entry which make up the displacement or immediate value.

The first of plurality of microcode first PC storage entries 650A includes a valid indication 652, a first PC address 654, and a microaddress 656. Microaddress 656 is pre-stored, while valid indication 652 and microcode first PC address 654 are written when a microcode instruction corresponding to microcode routine 650 is detected by PC control unit 12. Two addresses, a PC value and a microaddress may be used to branch to the first cache line of a microcode routine. Both addresses are compared in the event of a lookup operation. Note that subsequent entries in 650A do not have a first PC value since a directly executable instruction does not branch into the middle of a microcode routine.

Plurality of microcode next entry storage locations 650B are pre-stored with the exception of the last entry. Plurality of microinstruction cache lines 650C are pre-stored with directly executable instruction which effectuate the operation of a microcode instruction corresponding to microcode routine 650. Additionally, plurality of microcode branch prediction storage entries 650D are also pre-stored with the exception of the last entry, which may be updated during a write operation. Finally, plurality of microcode operand storage entries 650E include operand information conveyed from instruction select unit 910 on microcode operand bus 914.

Figure 8:
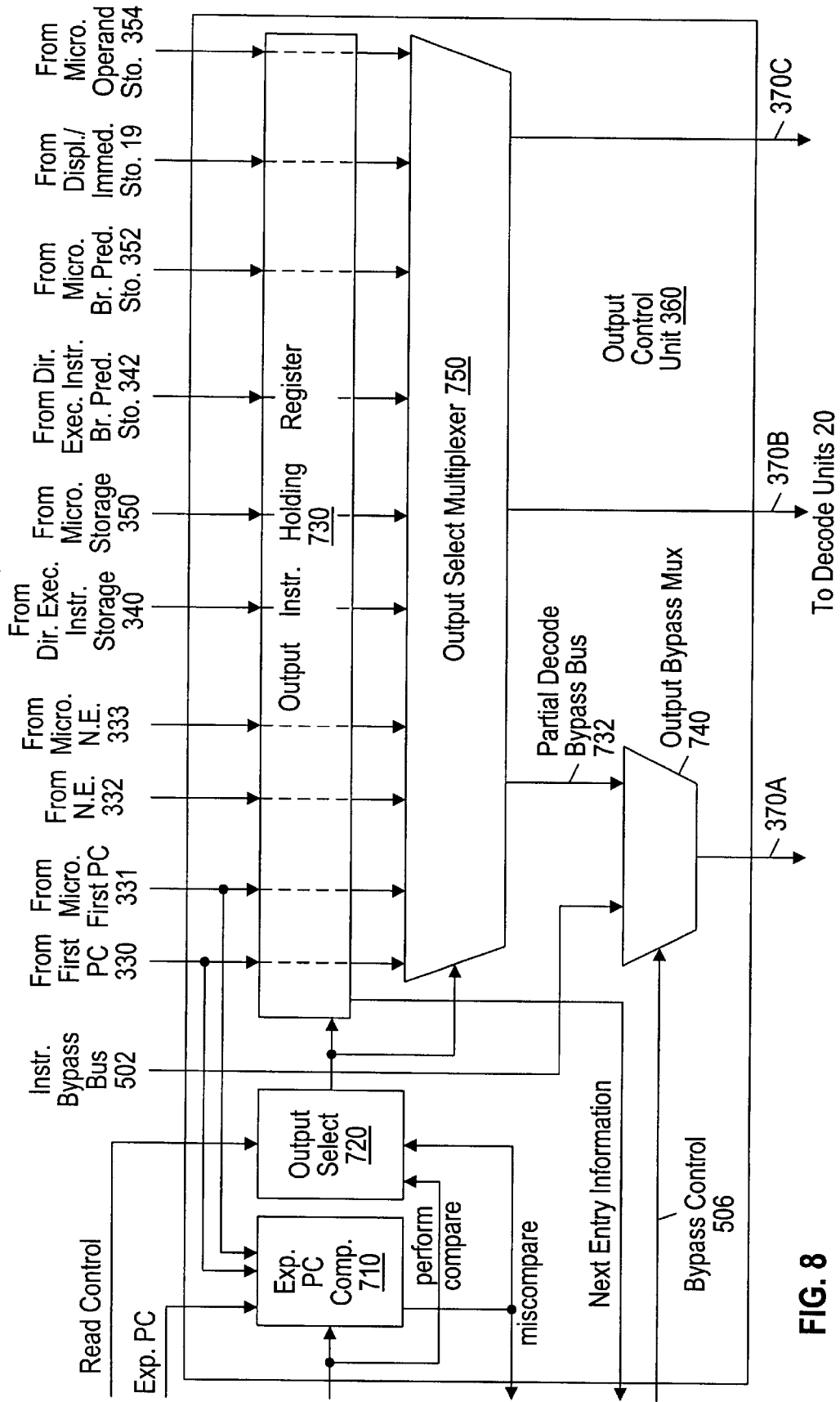
FIG. 8 is a block diagram of one embodiment of output control unit 360.

Turning now to FIG. 8, a block diagram of one embodiment of output control unit 360 is shown. Output control unit 360 includes an expected PC comparator 710, an output select unit 720, an output instruction holding register 730, an output bypass multiplexer 740, and an output select multiplexer 750. Expected PC comparator 710 receives control signals and an expected PC from PC control unit 12, as well as output from first PC storage 330 and microcode first PC storage 331. Expected PC comparator 710 conveys an indication of a PC miscompare to output select unit 720 and PC control unit 12. Output select unit 720 additionally receives control signals from PC control unit 12, and conveys control signals to output instruction holding register 730.

Output instruction holding register 730 receives the contents of an entry of decoded instruction cache 18 selected by a read operation. Output instruction holding register 730 conveys the cache line contents to output select multiplexer 750. In response to control signals provided by output select unit 720, output select multiplexer 750 conveys partial decode bypass bus 732 and partial decode output buses 370B–C. Partial decode bypass bus 732 is conveyed to output bypass multiplexer 740 along with instruction bypass bus 502 from input control unit 320. Bypass control signal 506 provides control for output bypass multiplexer 740, which conveys partial decode output bus 370A as output. Output instruction holding register 730 additionally conveys next entry information to PC control unit 12.

FIG. 8 depicts the flow of the read operation for decoded instruction cache 18, as well as instruction forwarding from the write operation. In one embodiment, as instructions are received one-by-one into instruction select unit 510 for conveyance to holding registers 522, 524, and 526, the instruction is conveyed to output control unit 360 via Instruction bypass bus 502. When bypass control signal 506 is asserted, the instruction on instruction bypass bus 502 is conveyed on partial decode output bus 370A to a first decode position. In this manner, instructions may enter the pipeline as soon as possible after an instruction fetch operation. In another embodiment, instructions may not be forwarded to output control unit 360 as received from early decode unit 16. Instead, the cache line is first written after the instructions have been received, then these instructions are concurrently conveyed to output control 360 and are handled in the manner which will be described for read operations below. In this embodiment, instruction bypass multiplexer 504 and output bypass multiplexer 740 are not employed.

PC control unit 12 performs a read operation by selecting a cache line and asserting read control signals. As described above, in one embodiment, read operations may be performed with or without a compare of the first PC value of the cache line to a expected PC value from PC control unit 12. If a comparison is desired, PC control unit 12 asserts an indication thereof. Generally, comparisons are not requested in reads resulting from lookup operations, and are requested when a read is performed in response to a valid next entry field.

In response to the read operation, the contents of the selected cache line are conveyed to output instruction holding register 730 and forwarded to output select multiplexer 750. The one or more partially decoded instructions and corresponding information from the cache line are stored in register 730 at least until selection by output select unit 720. If PC control unit 12 requests a PC compare for the read operation, the first PC value of the cache line is compared to the expected PC value from PC control unit 12, and an indication of a miscompare is conveyed to output select unit 720 and PC control unit 12. If a miscompare is detected, the instructions in output instruction holding register 730 are not valid, and are thus not conveyed as outputs from output select multiplexer 750. Instead, PC control unit 12 requests a lookup on the expected PC for which the miscompare was detected.

If no miscompare is detected, or a compare is not required, output select unit 720 provides control signals to output select multiplexer 750 to convey a number of partially decoded instructions as outputs. As described above, the number of partially decoded instructions included in a cache line within decoded instruction cache 18 may exceed the number of issue positions. Although all entries in a cache line may not include valid instructions, situations may arise in which more valid instructions may be present in a cache line than there are issue positions. Accordingly, output select unit 720 may provide control signals to output instruction holding register 730 and output select multiplexer 750 such that the partially decoded instructions in the cache line are conveyed to decode units 20 over a number of clock cycles. During each of these clock cycles, the contents of output instruction holding register 730 are conveyed to output select multiplexer 750. Output select unit 720 drives control signals to output select multiplexer 750 to select the proper instructions from the inputs. On the first of these clock cycles, output instruction holding register 730 conveys next entry information to PC control unit 12. This information is employed to generate the next cache access. Because output control unit 360 may take more than one clock cycle to dispatch instructions to decode units 20, PC control unit 12 advantageously has additional time to generate the entry point for a next cache access.

In another embodiment, displacement/immediate storage 19 is separated from decoded instruction cache 18 with entries in storage 19 being allocated as required. Instructions within decoded instruction cache 18 include a field specifying an index within displacement/immediate storage 19. Upon accessing a decoded instruction cache 18 entry with a valid displacement or immediate operand, the index for the operand is used to access displacement/immediate storage 19 for the operand value. Since the access to displacement/immediate storage 19 may employ an additional cycle for a read operation, the displacement and/or immediate values may be forwarded directly to the corresponding reservation station 22.

It is noted that in a different embodiment of decoded instruction cache 18, partially decoded directly executable instructions and microcode instructions may be stored in the same cache line. In such an embodiment, directly executable instructions are stored as described above. When a microcode instructions is encountered in the instruction stream, the directly executable instructions which make up the microcode routine are fetched from a microcode storage location and stored into the next available entry in the cache line. It is also noted that in another embodiment of decoded instruction cache 18, more than one branch instruction per line may be stored. In such an embodiment, a PC value is stored for each additional branch that it is predicted taken. In the case of a lookup operation, each PC value in each cache line is compared with the lookup address. The lookup operation may additionally return an offset within the cache line to begin fetching instructions from in a subsequent read operation.

Numerous variations and modifications will become apparent to those skilled in the art once the above disclosure is fully appreciated. It is intended that the following claims be interpreted to embrace all such variations and modifications.

What is claimed is:

1. A method for conveying partially decoded instructions from a decoded instruction cache, comprising:

generating an initial entry pointer by decoding an instruction;

receiving said initial entry pointer into said decoded instruction cache, thereby selecting a particular cache line which includes a plurality of partially decoded instructions and a next entry pointer, and wherein said plurality of partially decoded instructions effectuate an operation corresponding to said instruction if said instruction is a microcode instruction, and wherein a first one of said plurality of partially decoded instructions represents said instruction if said instruction is a directly executable instruction;

conveying said next entry pointer for a subsequent access to said decoded instruction cache;

dispatching at least one of said plurality of partially decoded instructions;

wherein said particular cache line includes branch prediction information including a next expected instruction address, and wherein said decoded instruction cache includes a plurality of first instruction addresses, wherein each of a plurality of cache lines in said decoded instruction cache includes one of said plurality of first instruction addresses, and wherein each of said plurality of first instruction addresses specifies an address of a corresponding partially decoded instruction within a corresponding one of said plurality of cache lines; and searching each of said plurality of first instruction addresses for said next expected address if said next entry pointer is invalid.

2. The method for conveying partially decoded instructions from a decoded instruction cache as recited in claim 1, wherein said dispatching includes dispatching up to a given number of said plurality of partially decoded instructions, wherein said given number is equal to a number of issue positions coupled to said decoded instruction cache.

3. The method for conveying partially decoded instructions from a decoded instruction cache as recited in claim 2, wherein said dispatching further includes dispatching up to a second given number of said plurality of partially decoded instructions which immediately follow in program order a partially decoded instruction within said plurality of partially decoded instructions previously dispatched, wherein said second given number is equal to said given number.

4. The method for conveying partially decoded instructions from a decoded instruction cache as recited in claim 1 wherein said particular cache line includes an index into an operand cache which specifies a location in said operand cache which includes an operand of said instruction.

5. The method for conveying partially decoded instructions from a decoded instruction cache as recited in claim 4 wherein said dispatching further includes conveying said index to said operand cache, thereby causing said operand cache to convey said operand of said instruction.

6. The method for conveying partially decoded instructions from a decoded instruction cache as recited in claim 1 wherein said searching includes returning a lookup entry pointer value if one of said plurality of first instruction addresses matches said next expected address.

7. The method for conveying partially decoded instructions from a decoded instruction cache as recited in claim 6 further comprising conveying said lookup entry pointer to said decoded instruction cache for a next cache access.

8. The method for conveying partially decoded instructions from a decoded instruction cache as recited in claim 7 further comprising writing a value of said lookup entry pointer to a next entry pointer field of said particular cache line, wherein said next entry pointer field includes said next entry pointer.

9. A superscalar microprocessor, comprising:

an instruction cache configured to convey a group of contiguous instruction bytes in response to receiving a fetch address, wherein a first instruction is located at said fetch address;

an early decode unit configured to receive and partially decode said group of contiguous instruction bytes, thereby conveying a first partially decoded instruction corresponding to said first instruction;

a decoded instruction cache configured to receive said first partially decoded instruction, wherein said decoded instruction cache is configured to store said first partially decoded instruction if said first partially decoded instruction is directly executable by said superscalar microprocessor, and wherein said decoded instruction cache is configured to store operand information from said first partially decoded instruction and a plurality of predetermined directly executable instructions if said first partially decoded instruction is one of a plurality of microcode instructions, and wherein said plurality of predetermined directly executable instructions, employing said operand information, effectuate operation of said first instruction when executed by said superscalar microprocessors;

wherein said first partially decoded instruction is directly executable and is stored in a particular cache line within said decoded instruction cache selected in response to an opcode corresponding to said first instruction, and wherein said particular cache line is configured to store a plurality of partially decoded instructions.

10. The superscalar microprocessor as recited in claim 9 wherein said early decode unit is further configured to convey a second partially decoded instruction corresponding to a second instruction within said group of contiguous instruction bytes following said first instruction in a program sequence.

11. The superscalar microprocessor as recited in claim 10 wherein said second partially decoded instruction is directly executable, and wherein said decoded instruction cache is configured to store said second partially decoded instruction subsequent to said first partially decoded instruction within said particular cache line.

12. The superscalar microprocessor as recited in claim 10 wherein said second partially decoded instruction is one of said plurality of microcode instructions, and wherein said decoded instruction cache is configured to store operand information to a given cache line, wherein said given cache line includes directly executable instructions which comprise a microcode routine which, when executed, effectuates operation of said second instruction by employing said operand information.

13. The superscalar microprocessor as recited in claim 12 wherein said particular cache line includes a next entry field specifying a next cache line to be executed, and wherein said decoded instruction cache is configured to store a pointer to said given cache line in said next entry field of said particular cache line.

14. A decoded instruction cache, comprising:

a first cache line including a first partially decoded, directly executable instruction and a second partially decoded, directly executable instruction, wherein said decoded instruction cache is configured to convey said first partially decoded, directly executable instruction to a first issue position coupled to said decoded instruction cache and to concurrently convey said second partially decoded, directly executable instruction to a second issue position coupled to said decoded instruction cache in response to a read operation specifying said first cache line;

a second cache line including a first predetermined directly executable instruction, a second predetermined directly executable instruction, and corresponding operand information, wherein said decoded instruction cache is configured to convey said first predetermined directly executable instruction and corresponding operand information to said first issue position and to concurrently convey said second predetermined directly executable instruction and corresponding operand information to said second issue position in response to a read operation specifying said second cache line, wherein said first predetermined directly executable instruction and said second predetermined directly executable instruction comprise a microcode routine which, when executed, effectuates operation of a corresponding microcode instruction.

15. The decoded instruction cache as recited in claim 14 wherein said first issue position and said second issue position are both configured to execute a same set of directly executable instructions.

16. The decoded instruction cache as recited in claim 14 wherein said first partially decoded, directly executable instruction includes an index specifying a location in an operand cache, wherein said location includes an operand employed by said first partially decoded, directly executable instruction.

17. The decoded instruction cache as recited in claim 16 wherein said decoded instruction cache is further configured to convey said index to said operand cache in response to a read operation specifying said first cache line, and wherein said operand cache is configured to convey said operand to said first issue position in response to receiving said index.

* * * * *